United States Patent

Saltzman et al.

[11] Patent Number: 5,620,218
[45] Date of Patent: Apr. 15, 1997

[54] APPARATUS FOR AFFIXING A TOWING DEVICE TO A VEHICLE

[75] Inventors: Mark J. Saltzman, Moreland Hills; Thomas A. Gries, Solon, both of Ohio

[73] Assignee: Buyers Products Company Inc., Mentor, Ohio

[21] Appl. No.: 587,563

[22] Filed: Jan. 17, 1996

Related U.S. Application Data

[63] Continuation of Ser. No. 278,510, Jul. 21, 1994, abandoned.

[51] Int. Cl.$^6$ .................................................. B60R 19/48
[52] U.S. Cl. .......................... 293/117; 293/155; 280/505
[58] Field of Search .................................. 293/102, 106, 293/116, 117, 154, 155; 280/500, 505

[56] References Cited

U.S. PATENT DOCUMENTS

| | | | |
|---|---|---|---|
| Re. 33,686 | 9/1991 | Bundy et al. | 293/117 |
| 2,492,914 | 12/1949 | Barden | 293/117 X |
| 2,993,721 | 7/1961 | Bowman | 293/106 |
| 3,318,617 | 5/1967 | Burns | 293/102 X |
| 3,501,170 | 3/1970 | Valle | 293/106 X |
| 3,614,136 | 10/1971 | Dent | 293/106 X |
| 3,837,674 | 9/1974 | Rathsack | 280/416.1 X |
| 3,848,893 | 11/1974 | Patterson | 280/416.1 X |
| 4,319,765 | 3/1982 | Rosenbaum | 280/504 |
| 4,379,569 | 4/1983 | Koch | 280/416.1 |
| 4,620,736 | 11/1986 | Shanks | 293/116 |
| 4,697,819 | 10/1987 | Cascone | 280/504 X |
| 4,993,610 | 2/1991 | Abretske et al. | 293/106 X |
| 5,364,142 | 11/1994 | Coiner | 293/106 X |

FOREIGN PATENT DOCUMENTS

| | | | |
|---|---|---|---|
| 2130151 | 5/1984 | United Kingdom | 293/102 |

OTHER PUBLICATIONS

*Equipment World*, Jan. 1994, "Integral Pintle–Mount Bumper".
"Hercules", Hercules Bumper, Inc. brochure, Apr. 1992.
Copy of an advertisement, undated, pp. 78–79.

*Primary Examiner*—Dennis H. Pedder
*Attorney, Agent, or Firm*—Fay, Sharpe, Beall, Fagan, Minnich & McKee

[57] ABSTRACT

An improved apparatus having a bumper-frame assembly suitable for light towing vehicles is disclosed. The invention can be utilized for attaching a pintle hook or receiver hitch to the rear end portion of the towing vehicle.

14 Claims, 4 Drawing Sheets

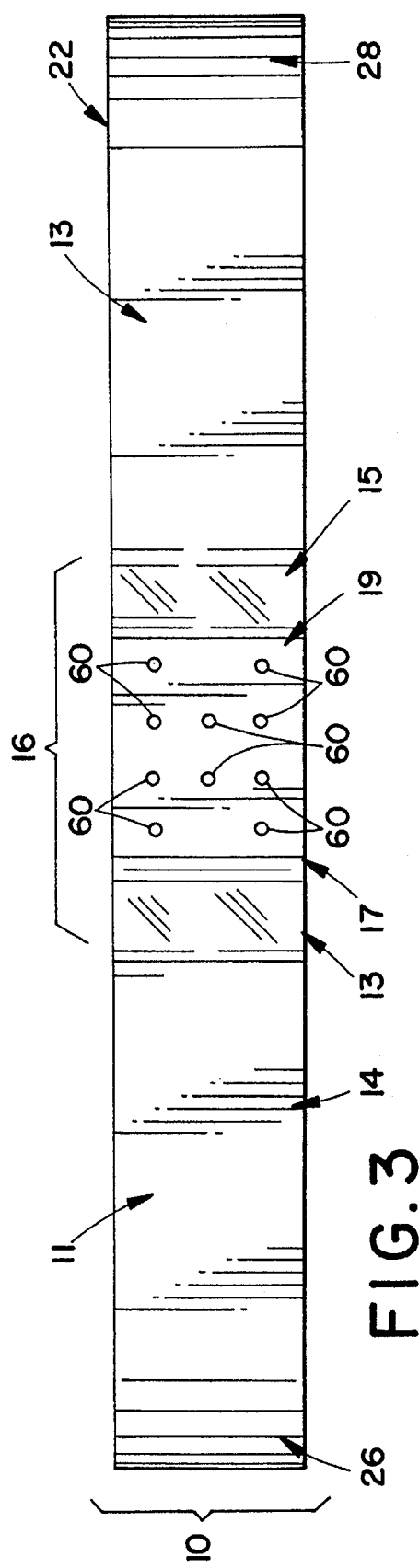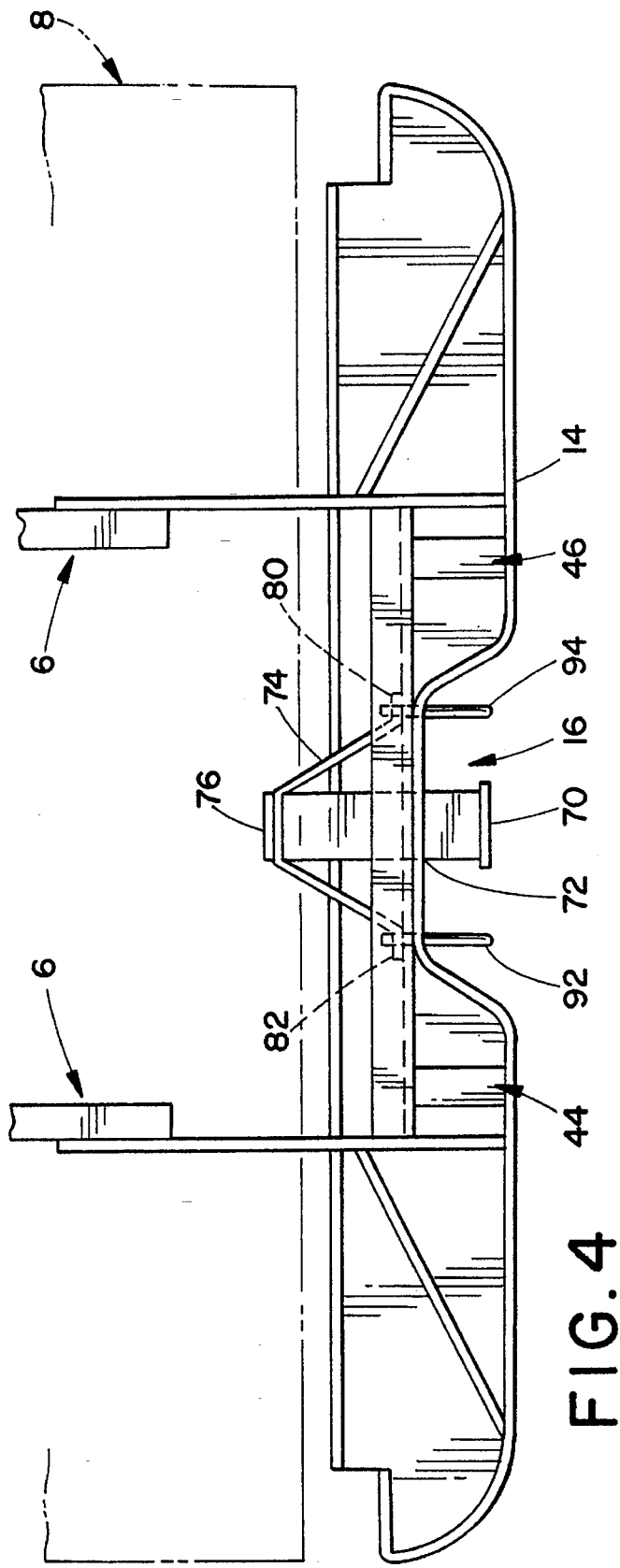

APPARATUS FOR AFFIXING A TOWING DEVICE TO A VEHICLE

This is a continuation of application Ser. No. 08/278,510 filed on Jul. 21, 1994 now abandoned.

BACKGROUND OF THE INVENTION

This invention relates to an apparatus for affixing a towing device, such as a pintle hook or receiver hitch to a towing vehicle. More particularly, the invention is directed to an apparatus which is secured to the rear end of a frame of a light towing vehicle such as a pick-up truck, van and/or utility vehicle. The apparatus comprises of a frame portion and a bumper portion, where in the frame potion has a general U-shaped channel beam located on a backside of the bumper and first and second support structures providing support and balance to the channel beam on the bumper. Such an apparatus also includes means for mounting a towing device such as a pintle hook or receiver hitch.

While the invention is particularly directed to the art of towing devices and the reinforcement of bumpers in the towing vehicle industry, and will be thus described with specific reference thereto, it will be appreciated that the invention may have usefulness in other fields and applications.

Typically, "step bumpers" utilized in connection with light towing vehicles are designed and particularly adapted to receive standard ball mount hitches. Such hitches represent connecting means of the "ball-and-socket" type as opposed to a "coupling-pintle" type, the two types of trailer hitches most commonly used today.

In this regard, the step bumper includes a horizontal pull plate spanning the bottom of the vertically disposed indented portion of the bumper, to which the ball mount hitch is attached. A reciprocating receiver socket is present in the draw bar of the vehicle to be towed. However, due to the height and configuration constraints of a pintle hook hitch and the inclusion of a horizontal pull plate spanning the bottom of the vertically disposed indented portion of the step bumper, a pintle hook hitch can not be directly utilized with a step bumper. As a consequence, a standard step bumper is not best suited for pintle hook assemblies and receiver hitches which require attachment directly to the face of the indented portion of the bumper. This is unfortunate because pintle hook assemblies and receiver hitches offer many advantages over standard ball mount hitches.

Briefly, as an alternative to the use of the ball mount arrangement, a pintle hook assembly is many times used. Usually, the pintle hook hitch is used to tow heavy equipment whereas the ball-and-socket type hitch is utilized with lighter equipment. A pintle hook hitch may be generally described as a hook or pintle attached by a mounting plate to the rear end of a towing vehicle which engages a ring-eyelet assembly that is attached to the draw bar of the vehicle to be towed. A closure member such as a spring-biased latch, mates with the hook or pintle. Due to the incorporation of an upwardly extending hook or pintle, a cavity disposed adjacent the pintle for receiving the coupling element (i.e. eyelet) of the drawn vehicle and a spring-biased, pivotally-mounted latch extending over the cavity, accidental disengagement (or decoupling) of the drawn vehicle is substantially reduced through the use of a pintle hook towing hitch assembly. Likewise, receiver hitch assemblies are often advantageously used.

In addition to the positioning and placement problems noted above for use of a pintle hook hitch with step bumpers, the configuration of the indented portion of the standard step bumper is such that it does not have sufficient strength and rigidity to efficiently utilize the full loading capacity of the pintle hook and receiver hitch assemblies. More particularly, for either the pintle hook or receiver hitch assemblies to be utilized, the horizontal pull plate positioned in the indented portion of the step bumper must be removed. The pintle hook or receiver hitch is then connected to the face of the indented portion. This face, however, is not designed to withstand the force of a load of this nature or potential magnitude. The load on the standard step bumper is intended to be absorbed by the horizontal pull plate, which generally must be removed when a pintle hook or receiver hitch assembly is used. Accordingly, insufficient strength and support exists.

As a result, if use of a pintle hook or receiver hitch is desired, an under chassis receiver hitch frame mount must be added to the towing vehicle along with a pintle hook mounting adapter or a receiver hitch mounting structure. However, such a combination requires a number of elements which must be constantly monitored and generally produces a coupling arrangement which is substantially lower than the height of the rear bumper of the towing vehicle.

Certain bumper reinforcement structures are known. For example, U.S. Pat. No. 4,620,736 to Shanks discloses an adapter plate for a vehicle bumper which uses a reinforcement member. However, the Shanks patent does not disclose a step bumper having an indented portion, a U-shaped channel beam of the present invention laterally disposed along the length of the bumper, corresponding support structures, or pintle hook and/or receiver hitch assemblies.

The present invention contemplates a new and improved towing apparatus for use on light towing vehicles and/or trailers which resolves the above-referenced difficulties and others. A further object of the invention is to provide an improved pintle hook and/or receiver hitch assembly for attachment to the rear end portion of a vehicle.

SUMMARY OF THE INVENTION

The subject invention relates generally to an improved apparatus having a bumper-frame assembly suitable for light towing vehicles. The invention can be utilized for attaching a pintle hook or receiver hitch to the rear end portion of the towing vehicles.

In addition, an apparatus for enhancing reinforcement of a step bumper of a light towing vehicle is provided. The step bumper has a front panel having a first side with an indented portion in the center thereof and a second side having a protruding portion corresponding to the indented portion. The bumper further has spaced apart attachment brackets for attachment of the bumper to a vehicle. A generally U-shaped channel beam is located on the protruding portion and between the attachment brackets.

In a more limited aspect of the invention, first and second support structures engage the channel beam in the second side of the front panel to provide further support to the U-shaped channel beam. In another aspect of the invention, a pintle hook assembly is attached to the first side in the indented portion of the front panel.

In still another aspect of the invention, a generally V-shaped bracket is connected to the second side of the front panel and a receiver attached to the U-shaped bracket extends through the front panel.

One advantage of the invention is reinforcement of a step bumper to support a pintle hook or receiver hitch assembly.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination, of the various parts of the device, or by the objects contemplated are attained as hereinafter more fully set forth, specifically pointed out in the claims and illustrated in the accompanying drawings in which:

FIG. 3 is a front elevational view of the apparatus of FIG. 1 without the pintle hook assembly;

FIG. 4 is a bottom plan view of an alternative embodiment of the apparatus of FIG. 1;

DETAILED DESCRIPTION OF THE PREFERRED EMBODIMENT

Figure 1:
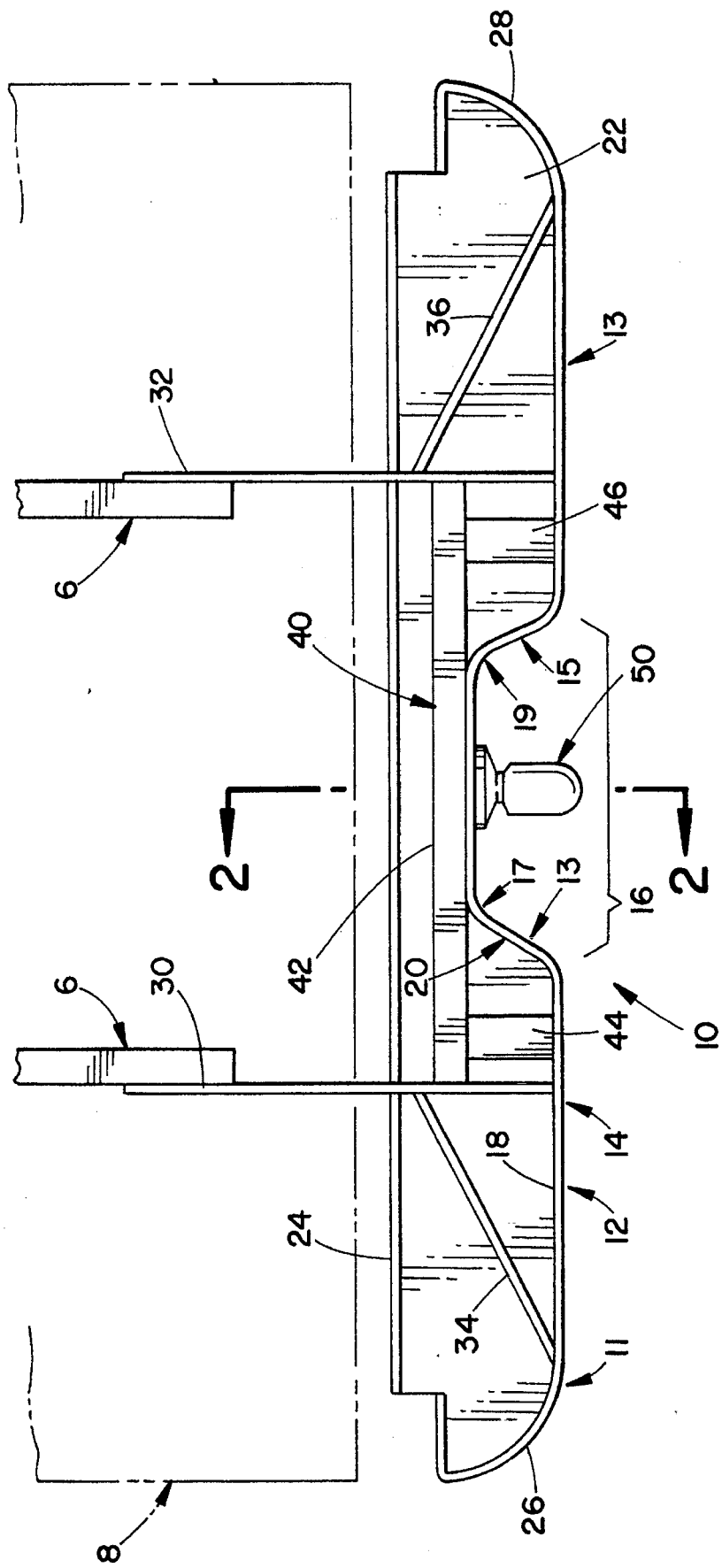
FIG. 1 is a bottom plan view of a frame-bumper apparatus incorporating the reinforcement device of the present invention mounted on the rear of a towing vehicle.
Figure 7:
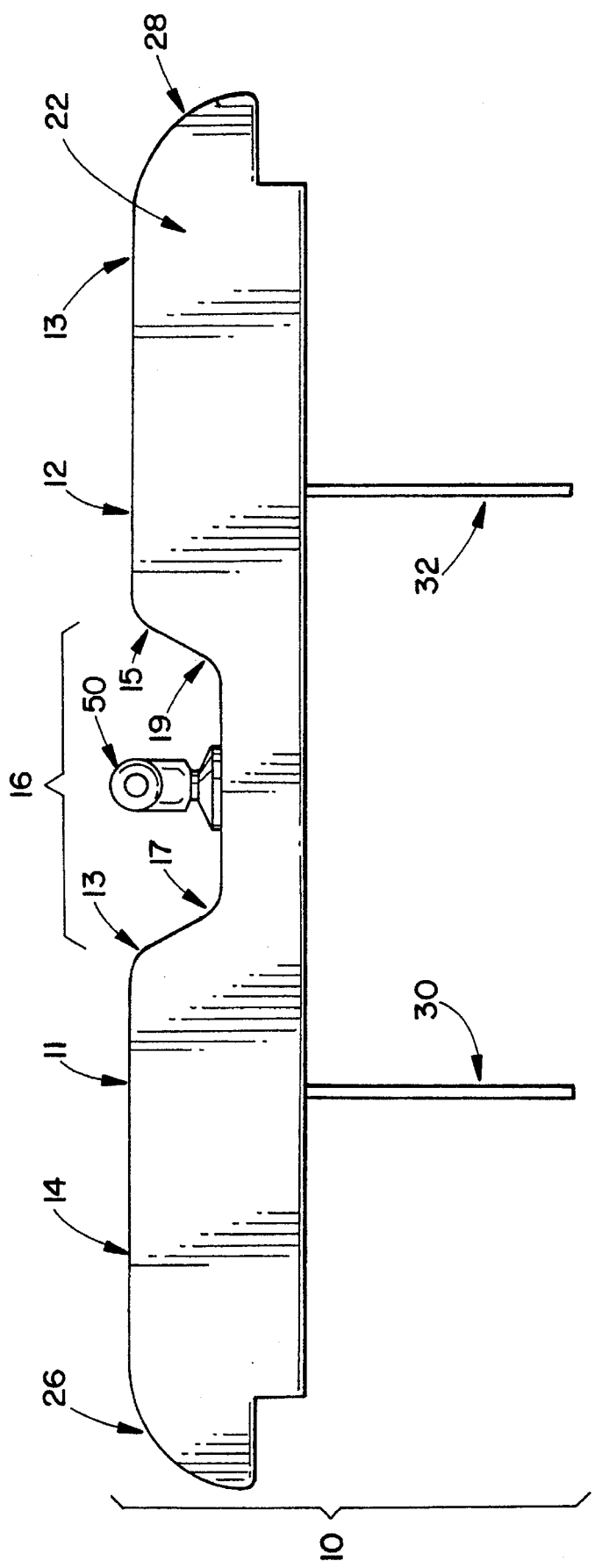
FIG. 7 is a top plan view of the apparatus of FIG. 1.

Referring now to the drawings wherein the showings are for purposes of illustrating the preferred embodiments of the invention only and not for the purposes of limiting same and wherein like and/or similar parts and/or elements are designated by the same numeral, FIG. 1 provides a bottom view and FIG. 7 provides a top view of one preferred embodiment. Apparatus 10 is a bumper-frame assembly which incorporates reinforcement apparatus 40. The apparatus 10 can be typically mounted onto the rear frame of a light towing vehicle 8, as will be described hereinafter.

As shown, the apparatus 10 includes a front panel 12 having a first side 14 comprising of two planar elements 11 and 13 with an indented portion 16. The indented portion 16 includes two convex panels 13 and 15 and two concave panels 17 and 19. The panel 12 also has a second side 18 opposed to said first side 14 having a protruding portion 20. The indented portion 16 and protruding portion 20 correspond to one another and are the result of the same curvature formed in the front panel 12. A horizontal pull plate, spanning the open bottom of the indented portion and usually included on a step bumper, is distinctly absent to facilitate attachment of the pintle hook 50 and/or receiver hitch assemblies.

Figure 2:
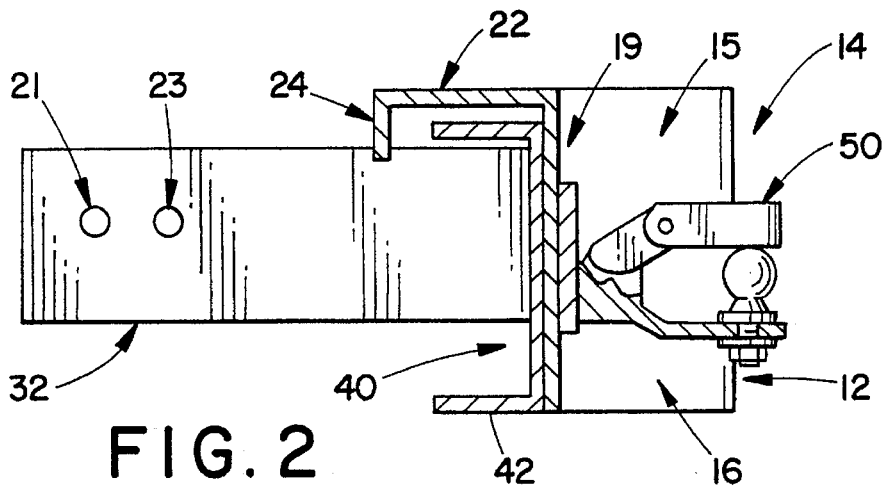
FIG. 2 is a cross sectional view taken along line 2—2 of FIG. 1 looking in the direction of the arrows.

As best illustrated in FIG. 2, the apparatus 10 also includes a top panel 22. The panel 22 extends the entire length of the apparatus 10 and serves as a stepping platform for the bumper when it is attached to a light towing vehicle. Extending from a back edge of top panel 22 is a lip 24 which extends along the length of the top panel 22.

Referring back now to FIG. 1 and FIG. 7, apparatus 10 has curved end portions 26 and 28. The end portions of the bumper may vary as those skilled in the art will appreciate. For example, the apparatus 10 may alternatively have squared end portions or tapered end portions.

As noted above, the apparatus 10 is typically mounted to the back end of a light towing vehicle and/or trailer. Attachment of the apparatus 10 to the vehicle is accomplished through first and second elongated attachment brackets 30, 32 by any known manner. For example, the brackets 30, 32 may be welded to the vehicle. Alternatively, the brackets may be secured through screws, nut and bolt arrangements, rivets, . . . etc. The elongated attachment brackets include holes 21 and 23 for mounting apparatus 10 to the frame of a towing vehicle 8 (FIG. 2).

Angled brackets 34, 36 are provided to the apparatus 10. The brackets 34, 36 extend from the attachment brackets 30, 32 to the second side 18 of the front panel 12. The angled brackets 34, 36 are secured to the attachment brackets and the panel 12 by means well known in the art such as through the use of suitable weld points.

Reinforcement to apparatus 10 is provided by the reinforcing apparatus 40. Reinforcing apparatus 40 includes a channel beam 42 and first and second support structures 44, 46. The channel beam 42 is located on the protruding portion 20 between the first and second attachment brackets 30, 32 and extends laterally along the length of the bumper 10. The first supporting structure 44 engages the channel beam 42 and the second side 18 of the front panel 12 between the first bracket 30 and the protruding portion 20. The second support structure 46 engages the channel beam 42 and the second side 18 of the front panel 12 between the second attachment bracket 32 and protruding portion 20. The apparatus 40 is preferably welded into proper position. However, other suitable attachment means known in the art such as screws, nut and bolt arrangements, rivets . . . etc. may be used.

As noted above, the channel beam 42 is located on the protruding portion 20 of the front panel 12 with the "U" shape extending along the length of the bumper and the open side of the "U" facing away from the portion 20. This arrangement provides increased strength to the protruding portion 20 and consequently the indented portion 16. Accordingly, a pintle hook assembly 50 is positioned on the indented portion 16 and attached to both the indented portion 16 and the channel beam 42 through apertures 60 (FIG. 3) and suitable attachment means.

Consequently, the strength of apparatus 10 is significantly increased for the pintle hook assembly. Any outward force applied to the pintle hook assembly 50 is dispersed through the channel beam 42 and the support structures 44, 46. Accordingly, greater loads can be carried by the bumper and cumbersome mounting adapters are avoided.

The channel beam 42 is generally U-shaped for strength. However, other strength reinforcing configurations such as corrugated beams or I-beams may be utilized so long as satisfactory strength requirements are met. Support structures 44 and 46, while shown as generally rectangular legs, may be of any shape or configuration so long as proper strength and balance is provided to the U-shaped beam 42.

As shown in FIG. 3, the apertures 60 are included in the indented portion 16. The apertures are arranged to provide selective height adjustment to the pintle hook assembly to accommodate towed vehicles of varying size.

Figure 5:
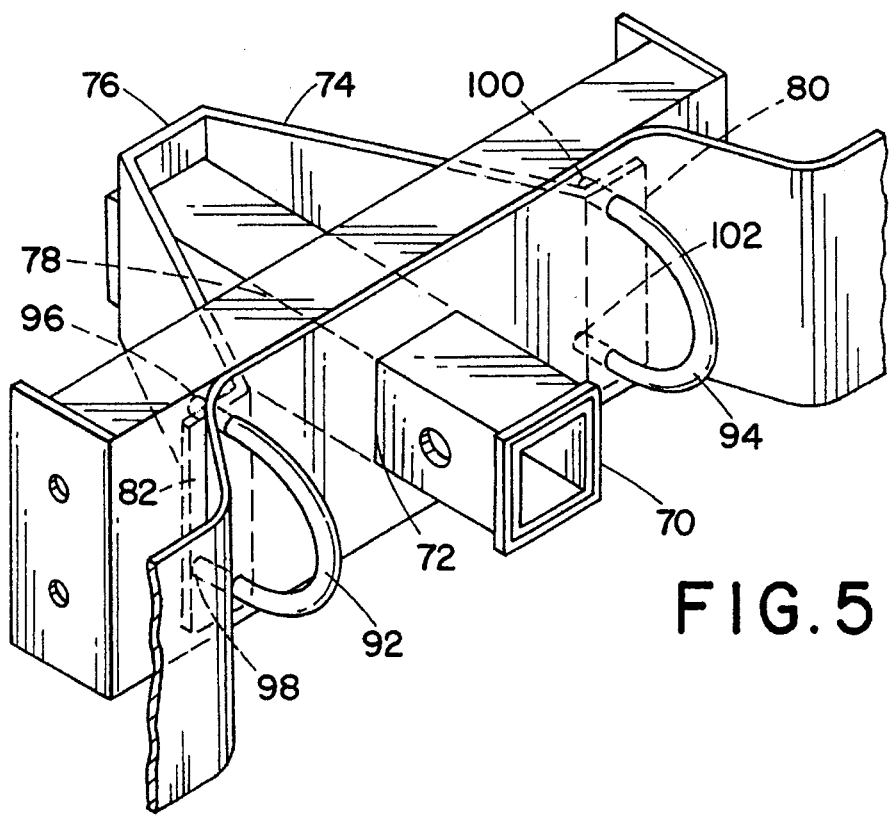
FIG. 5 is a perspective view of the apparatus of FIG. 4.

An alternative embodiment of the present invention is shown in FIGS. 4 and 5. The configuration of the alternative embodiment is substantially identical to that of FIG. 1 except that a receiver hitch 70, not a pintle hook assembly 50, is supported on the apparatus 10. As a consequence, an additional V-shaped bracket 74 is utilized.

More particularly, the receiver hitch 70 is disposed in an aperture 72 through the indented portion 16 (protruding portion 20) of the front panel 12 and the channel beam 42. While the receiving end of the receiver hitch is disposed on the first side 14 of the front panel 12 to receive corresponding hitch components of a towed vehicle, the opposite end is attached to the V-shaped bracket 74. The V-shaped bracket 74 has an apex 76 and an opposite open end 78. The bracket 74 is positioned so that the apex 76 is spaced away from the protruding portion 20 and the open end 78 faces the protruding portion 20. The opposite end of the receiver hitch 70 is mounted to the apex 76 through suitable mounting techniques such as welding or the like.

Figure 6:
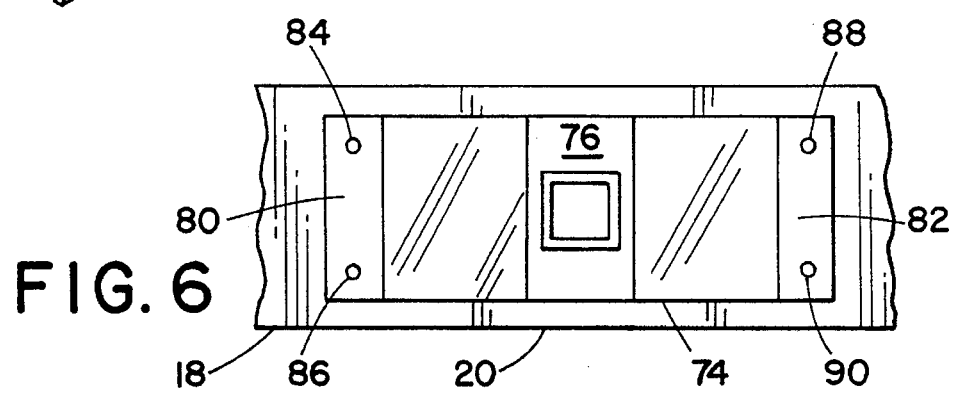
FIG. 6 is a back view of the apparatus of FIG. 4.

As shown in FIGS. 5–6, the V-shaped bracket 74 includes first flat edge 80 and second flat edge 82. On these edges, apertures 84, 86, 88, and 90 are disposed to facilitate attachment of the V-shaped bracket to the protruding portion 20.

Referring now to FIGS. 4–6, attachment of the V-shaped bracket is accomplished by providing U-shaped eyelets 92, 94 to be disposed in the indented portion 16 through corresponding apertures but also having attachment ends 96, 98, 100, 102 disposed on the second side 18 of the front panel 12 for engagement with the apertures 84, 86, 88, and 90 on the edges of the V-shaped brackets 74. The attachment ends of the eyelets 92, 94 are secured in the apertures by any suitable means such as welding or a bolt arrangement, if suitable threads are provided to the attachment ends.

The above description merely provides a disclosure of particular embodiments of the invention and is not intended for the purpose of limiting same thereto. As such, the invention is not limited to only the above described embodiments. Rather, it is recognized that one skilled in the art could conceive alternative embodiments that fall within the spirit and scope of the present invention.

Having thus described the invention, I claim:

1. A step bumper of a light towing vehicle comprising:

a front panel including 1) a first generally planar side having an indented portion positioned in a center thereof and 2) a second generally planar side having a protruding portion corresponding to the indented portion;

spaced apart first and second attachment brackets for attachment of the bumper to the vehicle;

a generally U-shaped channel beam, having an open side, located on the protruding portion and between the first and second attachment brackets, the open side of the beam facing away from the protruding portion;

a first support structure engaging the channel beam and the second side, spaced from a lateral side of the protruding portion, and between the first attachment bracket and the protruding portion; and, a second support structure engaging the channel beam and the second side, spaced from an opposite lateral side of the protruding portion, and between the second attachment bracket and the protruding portion.

2. The bumper of claim 1 further comprising a pintle hook assembly adjustably attached to the first side in the indented portion.

3. A step bumper of a light towing vehicle comprising:

a front panel including 1) a first generally planar side having an indented portion positioned in a center thereof and 2) a second generally planar side having a protruding portion corresponding to the indented portion;

spaced apart first and second attachment brackets for attachment of the bumper to the vehicle;

a generally U-shaped channel beam located on the protruding portion and between the first and second attachment brackets;

a first support structure engaging the channel beam and the second side, spaced from a lateral side of the protruding portion, and between the first attachment bracket and the protruding portion;

a second support structure engaging the channel beam and the second side, spaced from an opposite lateral side of the protruding portion, and between the second attachment bracket and the protruding portion;

a generally V-shaped bracket having an apex and an open end, the V-shaped bracket being connected to the second side so that the open end faces the protruding portion and the apex is spaced from the protruding portion;

an aperture in the protruding portion; and, a receiver extending through the aperture having a first end connected to the apex and a second end disposed on the first side of the bumper.

4. The bumper of claim 3 further comprising opposed eyelets positioned on the first side on opposite sides of the second end of the receiver.

5. A step bumper of a light towing vehicle comprising:

a front panel including 1) a first generally planar side having an indented portion positioned in a center thereof and 2) a second generally planar side having a protruding portion corresponding to the indented portion;

spaced apart first and second attachment brackets for attachment of the bumper to the vehicle;

a generally U-shaped channel beam, having an open side, located on the protruding portion and between the first and second attachment brackets, the open side of the beam facing away from the protruding portion;

a first support structure engaging the channel beam and the second side, spaced from a lateral side of the protruding portion, and between the first attachment bracket and the protruding portion;

a second support structure engaging the channel beam and the second side, spaced from an opposite lateral side of the protruding portion, and between the second attachment bracket and the protruding portion; and, a pintle hook assembly attached to the first side in the indented portion.

6. A step bumper of a light towing vehicle comprising:

a front panel including 1) a first generally planar side having an indented portion positioned in a center thereof 2) a second generally planar side having a protruding portion corresponding to the indented portion, and 3) an aperture extending through the protruding portion and the indented portion;

spaced apart first and second attachment brackets for attachment of the bumper to the vehicle;

a generally U-shaped channel beam located on the protruding portion and between the first and second attachment brackets;

a first support structure engaging the channel beam and the second side, spaced from a lateral side of the protruding portion, and between the first attachment bracket and the protruding portion;

a second support structure engaging the channel beam and the second side, spaced from an opposite lateral side of the protruding portion, and between the second attachment bracket and the protruding portion;

a generally V-shaped bracket having an apex and an open end, the V-shaped bracket being connected to the second side so that the open end faces the protruding portion and the apex is spaced from the protruding portion; and, a receiver extending through the aperture having a first end connected to the apex and a second end disposed on the first side of the bumper.

7. The bumper of claim 6 further comprising opposed eyelets positioned on the first side on opposite sides of the second end of the receiver.

8. An apparatus for reinforcement of a step bumper of a light towing vehicle, the step bumper having an indented portion positioned in a center thereof, a protruding portion corresponding to the indented portion, and spaced apart first and second attachment brackets for attachment of the bumper to the vehicle, the apparatus comprising:

a generally U-shaped channel beam, having an open side, located on the protruding portion and between the first and second attachment brackets, the open side of the beam facing away from the protruding portion;

a first support structure engaging the channel beam, spaced from a lateral side of the protruding portion, and between the first attachment bracket and the protruding portion; and, a second support structure engaging the channel beam, spaced from an opposite lateral side of the protruding portion, and between the second attachment bracket and the protruding portion.

9. The apparatus of claim 8 further comprising a pintle hook assembly adjustably attached to the indented portion.

10. An apparatus for reinforcement of a step bumper of a light towing vehicle, the step bumper having an indented portion positioned in a center thereof, a protruding portion corresponding to the indented portion, and spaced apart first and second attachment brackets for attachment of the bumper to the vehicle, the apparatus comprising:

a generally U-shaped channel beam located on the protruding portion and between the first and second attachment brackets;

a first support structure engaging the channel beam, spaced from a lateral side of the protruding portion, and between the first attachment bracket and the protruding portion;

a second support structure engaging the channel beam, spaced from an opposite lateral side of the protruding portion, and between the second attachment bracket and the protruding portion;

a generally V-shaped bracket having an apex and an open end, the V-shaped bracket being positioned so that the open end faces the protruding portion and the apex is spaced from the protruding portion;

an aperture in the protruding portion; and, a receiver extending through the aperture having a first end connected to the apex and a second end disposed on a first side of the bumper.

11. The apparatus of claim 10 further comprising opposed eyelets positioned on the first side on opposite sides of the second end of the receiver.

12. An apparatus for reinforcement of a step bumper of a light towing vehicle, the step bumper having an indented portion positioned in a center thereof, a protruding portion corresponding to the indented portion, and spaced apart first and second attachment brackets for attachment of the bumper to the vehicle, the apparatus comprising:

a generally U-shaped channel beam, having an open side, located on the protruding portion and between the first and second attachment brackets, the open side of the beam facing away from the protruding portion;

a first support structure engaging the channel beam, spaced from a lateral side of the protruding portion, and between the first attachment bracket and the protruding portion;

a second support structure engaging the channel beam, spaced from an opposite lateral side of the protruding portion, and between the second attachment bracket and the protruding portion; and, a pintle hook assembly attached to the indented portion.

13. An apparatus for reinforcement of a step bumper of a light towing vehicle, the step bumper having an indented portion positioned in a center thereof, a protruding portion corresponding to the indented portion, an aperture extending through the protruding portion and the indented portion, and spaced apart first and second attachment brackets for attachment of the bumper to the vehicle, the apparatus comprising:

a generally U-shaped channel beam located on the protruding portion and between the first and second attachment brackets;

a first support structure engaging the channel beam, spaced from a lateral side of the protruding portion; and between the first attachment bracket and the protruding portion;

a second support structure engaging the channel beam, spaced from an opposite lateral side of the protruding portion, and between the second attachment bracket and the protruding portion;

a generally v-shaped bracket being positioned so that the open end faces the protruding portion and the apex is spaced from the protruding portion;

a receiver extending through the aperture having a first end connected to the apex and a second end disposed on a first side of the bumper.

14. The apparatus of claim 13 further comprising opposed eyelets positioned on the first side on opposite sides of the second end of the receiver.

\* \* \* \* \*